United States Patent Office 3,029,062
Patented Apr. 10, 1962

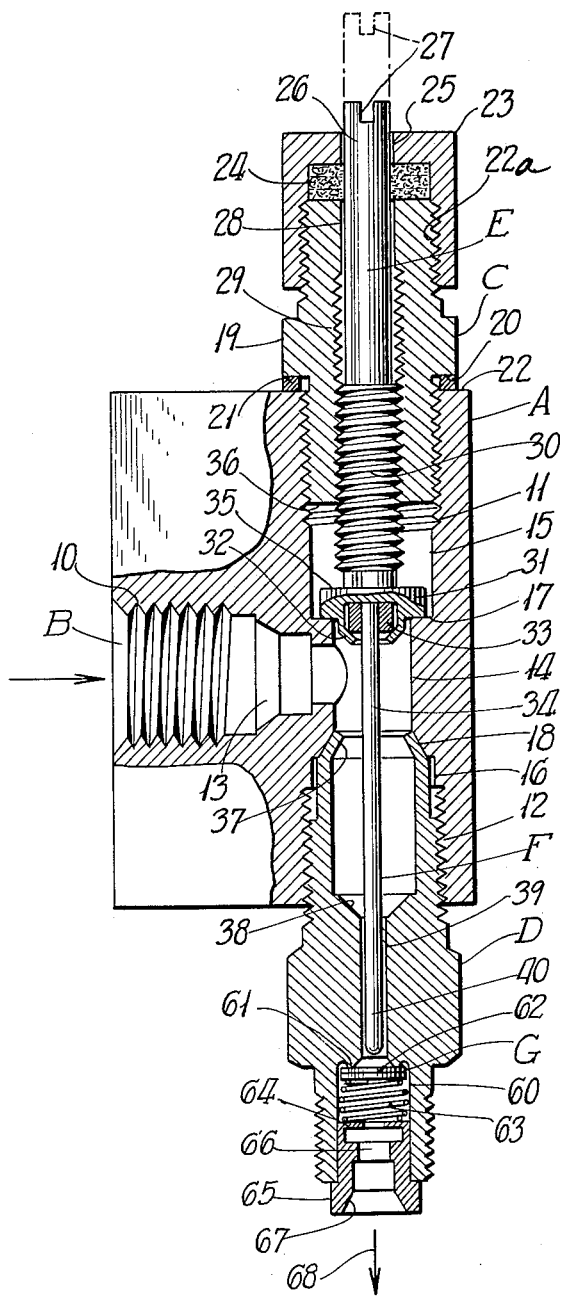

3,029,062
LUBRICATION
Thomas R. Thomas, New York, N.Y., assignor to Auto Research Corporation, Boonton, N.J., a corporation of Delaware
Filed Sept. 21, 1959, Ser. No. 841,292
8 Claims. (Cl. 251—121)

The present invention relates to a lubricating installation and it particularly relates to a centralized lubricating installation provided with flow metering outlets having a predominating effect upon the distribution of lubricant among the borings of a mechanism to be lubricated.

It is among the objects of the present invention to provide a novel, high restriction flow metering fitting which will be useful at the spaced and distributed outlets of a branch distributing system to control the flow and distribution of lubricant among a plurality of borings to be lubricated from a central lubricant pressure source.

It is among the further objects of the present invention to provide a flow metering fitting, particularly of the pin-in-bore type, which will permit accurate and adjustable control of the distribution of lubricant among the various outlets of a branch distributing tubing system leading to the spaced borings of a machine to be lubricated.

Still further objects and advantages will appear in the more detailed description set forth below, it being understood, however, that this more detailed description is given by way of illustration and explanation only and not by way of limitation, since various changes therein may be made by those skilled in the art without departing from the scope and spirit of the present invention.

In accomplishing the above objects, it has been found most satisfactory, according to a preferred embodiment of the present invention, to provide a pin-in-bore flow metering fitting, which, although it has a tremendously higher obstructing effect on the flow of lubricant than the tubing system or the bearing itself, will nevertheless be adjustable so that the amount of lubricant may be distributed among the various bearings in accordance with their lubricant requirements.

In the preferred form of the invention, the pin is adjustably inserted within or withdrawn from the bore by an associated fitting having the adjustable screw connection which will permit the pin to be partly withdrawn from or inserted within the closely fitting bore, with a clearance of one- or a few thousandths of an inch.

In the preferred form, a junction fitting is provided, having three tap or threaded recesses, one of which serves to receive an inlet connection from a centralized lubricating pump, and the other two of which are desirably aligned with each other and respectively receive at opposite ends of the fitting a threaded adjustment element and a flow metering fitting unit carrying a check valve and the adjustable pin-in-bore device.

With the foregoing and other objects in view, the invention consists of the novel construction, combination and arrangement of parts as hereinafter more specifically described, and illustrated in the accompanying drawings, wherein is shown an embodiment of the invention, but it is to be understood that changes, variations and modifications can be resorted to which fall within the scope of the claims hereunto appended.

In the drawing, wherein like reference characters denote corresponding parts throughout:

The single FIGURE shows the adjustable flow metering device of the present invention in longitudinal section.

Referring to FIG. 1, there is shown a junction unit A having a flow inlet connection B from a central lubricant pump or pressure source, the adjustment unit C and the meter unit D.

The adjustment unit C has a central threaded adjustment element E, whereas the meter unit D has an adjustable pin-in-bore restriction or obstruction unit F and the spring seated check valve G.

The junction block A may consist of a square of non-porous metal, either steel or brass, and it is provided with the tap recesses 10, 11 and 12. The tap recess 10 receives the inlet connection, not shown, which may be connected by a tubing or conduit to a central lubricant pressure source or pump.

From the tap recess 10 the lubricant will flow into the lower part of the socket 13 and then into the transverse bore or chamber 14. One end of the chamber or bore 14 opens into the socket 15, which is tapped as indicated at 11, and the other opens into the chamber 16, the outer end of which is tapped as indicated at 12.

At the ends of the bore 14 is the shoulder 17 and the beveled portion or seat 18. The adjustment element C has a large central portion 19 with a shoulder 20 which compresses the gasket 21 against the face 22 of the body element A.

The other end of the element C is threaded as indicated at 22a to receive the tap cap 23 which compresses the gaskets 24 into position. The cap 23 has a central opening 25 through which projects the post 26 having the filister slot 27.

The body C has a central bore 28 which is tapped or threaded as indicated at 29 to receive the lower threaded shank 30 of the post 26. The threaded shank 30 has a lower base or flange member 31 with the flanges 32 which engage the head 33 on the elongated pin restriction element 34.

This flange 31 will contact at one extreme position the shoulder 17, and the face 35 of the element will contact the face 36 at the other extreme position.

This will provide the limits of adjustment for the meter unit.

The meter unit D will have the tapered end portion 37 which will abut and form a lubricant tight connection against the shoulder 18. The body D has an inlet recess 38 in which the filter unit may be inserted, if desired. At the lower end of the recess 38 is positioned the accurately drilled bore 39 which receives the lower end 40 of the pin 34.

The pin-in-bore 39 forms a very small annular opening on the order of a thousandth of an inch or several thousandths of an inch.

This crevice will afford a restricting effect tremendously greater than that encountered in the tubing system leading to the bearing and also tremendously greater than any obstructing effect encountered in the bearing clearances.

Thus the crevices formed between the bore 39 and the pin 40 will predominantly control the distribution of lubricant among the various bearings.

The metering fitting D has an outlet socket 60 at the inner end of which is a valve seat 61.

Against this valve seat is pressed the plastic face 62 of the check valve G which is backed up by the barrel spring 63. The barrel spring at its outside end contacts the in-turned flange 64 of the insert 65. The insert 65 has a central opening 66 and a tapered face 67 to receive a compressing coupling connection.

The length of the pin 40 in the bore 39 may be regulated by screwing the post 26 from its solid to its dotted line position, as indicated at 27.

The dotted line position will give minimum restriction, while the solid line position will give maximum restriction.

It is thus possible to regulate the amount of drops of oil which will flow out of the fitting, as indicated by the arrow 68, into the bearing from one or two drops for pressure application from the central pump to four to six drops as the pin 40 is withdrawn from the bore 39.

It is thus apparent that the applicant has provided a simple, accurate, reliably adjustable high restriction flow metering fitting which will accurately control the distribution and proportionment of lubricant among the spaced bearings of a mechanism whether it be an automobile chassis or a machine tool such as a lathe, or a printing press, or any other type of automatic or semi-automatic machine having a plurality of spaced bearings at different levels and at different distances from a central lubricant pump.

As many changes could be made in the above lubrication, and many widely different embodiments of this invention could be made without departure from the scope of the claims, it is intended that all matter contained in the above description shall be interpreted as illustrative and not in a limiting sense.

Having now particularly described and ascertained the nature of the invention, and in what manner the same is to be performed, what is claimed is:

1. An adjustable high restriction lubricant flow metering fitting for a centralized lubrication system having a junction unit of the type having an axially bored body with inlet and outlet connections and carrying a meter unit, said meter unit having an axial flow passage including a pin-in-bore restriction and an outlet check valve and means to vary the restriction effect of the pin-in-bore restriction, said pin being slidable in said bore and the end of said pin being retained in said bore at all times and said pin-in-bore being cylindrical throughout their length so as to form an annular crevice without valving contact between the pin and the bore, said outlet check valve having a valve facing disk transverse to the axis of the bore and the pin and located beyond the ends of the bore and pin in the direction of flow.

2. An adjustable high restriction lubricant flow metering fitting for a centralized lubrication system having a junction unit of the type having an axially bored body with inlet and outlet connections and carrying a meter unit, said meter unit having an axial flow passage includcluding a pin-in-bore restriction and an outlet check valve and means to vary the restriction effect of the pin-in-bore restriction, said means including a threaded adjustment to regulate the length of said pin in said bore, said pin being slidable in said bore and the end of said pin being retained in said bore at all times and said pin-in-bore being cylindrical throughout their length so as to form an annular crevice without valving contact between the pin and the bore, said outlet check valve having a valve facing disk transverse to the axis of the bore and the pin and located beyond the ends of the bore and pin in the direction of flow.

3. An adjustable high restriction lubricant flow metering fitting for a centralized lubrication system having a junction unit of the type having an axially bored body with inlet and outlet connections and carrying a meter unit, said meter unit having an axial flow passage including a pin-in-bore restriction with a threaded adjustment and an outlet check valve and means to vary the restriction effect of the pin-in-bore restriction, said junction having aligned tap openings, one receiving the meter unit and an opposite one receiving the threaded adjustment for the pin of said meter unit, said pin being slidable in said bore and the end of said pin being retained in said bore at all times and said pin-in-bore being cylindrical throughout their length so as to form an annular crevice without valving contact between the pin and the bore, said outlet check valve having a valve facing disk transverse to the axis of the bore and the pin and located beyond the ends of the bore and pin in the direction of flow.

4. An adjustable high restriction lubricant flow metering fitting for a centralized lubrication system having a junction unit of the type having an axially bored body with inlet and outlet connections and carrying a meter unit, said meter unit having an axial flow passage including a pin-in-bore restriction with a threaded adjustment and an outlet check valve and means to vary the restriction effect of the pin-in-bore restriction, said junction having aligned tap openings, one receiving the threaded adjustment for the pin of said meter unit, said adjustment being accessible from the exterior of said fitting, said pin being slidable in said bore and the end of said pin being retained in said bore at all times and said pin-in-bore being cylindrical throughout their length so as to form an annular crevice without valving contact between the pin and the bore, said outlet check valve having a valve facing disk transverse to the axis of the bore and the pin and located beyond the ends of the bore and pin in the direction of flow.

5. An adjustable high restriction flow metering fitting having a T-shaped body with an inlet tapped socket in the stem of the T-body and tapped axially aligned sockets in the arms of the T-body, the body having a central inlet chamber at the junction of the stem and the arms, the tapped sockets at their bottom inner ends all opening into said central inlet chamber, one of the axially aligned sockets receiving a shouldered adjustment plug member and the other of said axially aligned sockets receiving a flow restriction plug member, the adjustment plug member having a tapped passageway and a threaded adjustment member plugging said passageway and the restriction plug member having a narrow diameter central cylindrical bore and a small diameter pin adjustable therein with the end of the pin always being received in the bore and forming an elongated narrow circumferential annular crevice of varying length, a turnable connection between the adjustment threaded member and the pin located adjacent the central inlet chamber and a spring seated check valve in the restriction plug beyond said bore.

6. The fitting of claim 5, said outer ends of said plug members being externally threaded, a sealing cup being threaded onto the outer end of the adjustment plug member and the threaded end of the restriction plug member serving to enable attachment to a bearing.

7. The fitting of claim 5, said turnable connection consisting of an extension of the pin through and beyond the central inlet chamber, an enlargement on the end of said pin and a cup engaging and enclosing said enlargement and mounted on the inside end of the threaded adjustment member.

8. The fitting of claim 5, the shoulder of the adjustment plug member having a gasket tight connection to the end of one T-arm and the inlet end of the restriction plug member having a conical seal to one end of said central inlet chamber.

References Cited in the file of this patent
UNITED STATES PATENTS

| | | |
|---|---|---|
| 712,376 | Hartwig | Oct. 28, 1902 |
| 1,510,802 | Scott | Oct. 7, 1924 |
| 2,646,066 | Nemetz | July 21, 1953 |
| 2,874,719 | Van Tuyl | Feb. 24, 1959 |
| 2,925,243 | Griswold | Feb. 16, 1960 |